United States Patent [19]

Ju et al.

[11] Patent Number: 5,320,326

[45] Date of Patent: Jun. 14, 1994

[54] IMPROVED STRUCTURE OF A QUICK-CONNECT PIPE FITTING

[76] Inventors: Ted Ju, 18, Lane 30, Syh Wei Rd., Wu Gu Hsiang, Taipei Hsien; Yih-Ching Her, 72, How Tsoch, How Tsuoh Tsuen, Koou Hwu Hsiang, Yun Lin Hsien, both of Taiwan

[21] Appl. No.: 74,491

[22] Filed: Jun. 11, 1993

[51] Int. Cl.$^5$ .............................................. F16L 37/28
[52] U.S. Cl. ............................ 251/149.6; 251/149.1
[58] Field of Search ........................ 251/149.6, 149.1; 137/614, 614.02

[56] References Cited

U.S. PATENT DOCUMENTS

| | | | |
|---|---|---|---|
| 116,655 | 7/1871 | Westinghouse, Jr. | 251/149.1 |
| 2,265,267 | 12/1941 | Cowles | 251/149.6 |
| 2,777,716 | 1/1957 | Gray | 251/149.6 |
| 3,280,834 | 10/1966 | Zahuranec | 251/149.6 |

FOREIGN PATENT DOCUMENTS

| | | |
|---|---|---|
| 590840 | of 0000 | United Kingdom . |
| 2134612 | 8/1984 | United Kingdom . |

*Primary Examiner*—A. Michael Chambers
*Attorney, Agent, or Firm*—Wenderoth, Lind & Ponack

[57] ABSTRACT

An improved structure of a quick-connect pipe fitting, and particularly a structure for a quick-connect pipe fitting used to connect a pressure pipe or a hydraulic tubing in a system comprises a compression member on top of a lock washer such that the compression member is fitted and secured in a base. When a pressure pipe is inserted into the pipe fitting, the compression member is screwed on but remains loose. In disconnecting the pressure pipe, the compression member is pushed downward, against the lock washer so as to disengage the inner teeth thereof from the pipe. The pressure pipe is no longer locked and may be pulled out easily. In addition, the quick-connect pipe fitting may include a connecting member which is used to install an air valve. Such air valve comprises a seal ring, a vent valve having vent holes, a connecting base and a spring. When the pressure pipe is inserted into the pipe fitting, it pushes the vent valve down such that the vent holes are opened and the fitting body allows air to flow therethrough. The spring normally pushes against the vent valve such that the vent holes are closed by the seal ring to form an air-tight seal.

14 Claims, 4 Drawing Sheets

IMPROVED STRUCTURE OF A QUICK-CONNECT PIPE FITTING

BACKGROUND OF THE INVENTION (a) Field of the Invention

The present invention relates in general to an improved structure of a pipe fitting, and particularly to the structure of a quick-connect pipe fitting for connecting piping or hydraulic tubing.

(b) Description of the Prior Art

A conventional quick-connect pipe fitting is shown in FIG. 6. Such fitting mainly includes a quick-connect fitting body 10, a seal washer 20, a lock washer 30, a base 40 and a pressurized washer 50. The fitting is used for connecting a plastic pipe 60 in a pressurized or hydraulic system. The lock washer and the seal washer lock and seal the pipe connection in an air-tight system. To disconnect this conventional pipe fitting, the pressurized washer 50 has to be pushed down to touch the lock washer and open up the inner teeth of the lock washer. Since the diameter of the ring-shaped pressurized washer 50 is very small, and the lock washer has a very high locking strength, it is not easy to push down the pressurized washer. The pressing is uncomfortable for the fingers. In addition, a majority of the pressurized washers today are made out of plastic materials, and they tend to lock dead after a period of time due to the teeth marks on the inner wall of the pipe. Pushing the pressurized washer down with too much force can crack or break the plastic washer making it necessary to shutdown the pressurized system to replace the pipe fitting.

In addition, the above conventional quick-connect pipe fitting is directly connected to a vent tube through the threads at the end of the fitting body. Therefore, air flow can always pass through the pipe fitting to the vent tube. The conventional pipe fitting does not provide a mechanism to close the air flow. After the conventional quick-connect pipe fitting is connected to a pressure pipe, the valve has to be opened for servicing. This is inconvenient. Moreover, when a main pipe is branched out to several service locations, all the quick-connect pipe fittings have to be connected on both sides before the main valve can be opened for servicing. The addition of an individual shutoff valve to each line with a quick-connect pipe fitting is costly and creates more work in operation.

SUMMARY OF THE INVENTION

The main object according to the present invention is to provide a new structure of a quick-connect pipe fitting for connecting pressure pipes. The new structure has a compression member installed on top of a lock washer. When the compression member is pushed downward, it opens up the lock washer. Therefore, the disconnecting of the pressure pipe is easy. Moreover, the compression member is appropriately screwed to a base of the fitting, ensuring a solid connection of the fitting to the pressure pipes.

Another object according to the present invention is to provide a structure of a quick-connect pipe fitting with an internal air valve, which comprises a seal ring, a vent valve, a connecting base, and a spring. Normally the internal air valve is in a closed position with the spring pushing the vent valve against the seal washer. When a pressure pipe is connected to the pipe fitting, it pushes the vent valve to an open position. Thus air flow can pass through the vent valve and the connecting base. The operation involved with the pipe fitting of the present invention is easier and the errors are minimized. Moreover, the new structure of the pipe fitting is simple and its function is precise.

A further object according to the present invention is to provide the structure of a quick-connect pipe fitting, a plurality of which can be connected in parallel to a main line. Each quick-connect pipe fitting is normally closed to block the air flow but opens up when it is connected to a pressure pipe. Therefore, individual shutoff valves may be eliminated and the operation is simplified.

BRIEF DESCRIPTION OF THE DRAWINGS

The drawings disclose an illustrative embodiment of the present invention which serves to exemplify the various advantages and objects thereof, and are as follows.

DETAILED DESCRIPTION OF THE PREFERRED EMBODIMENT

Figure 1:
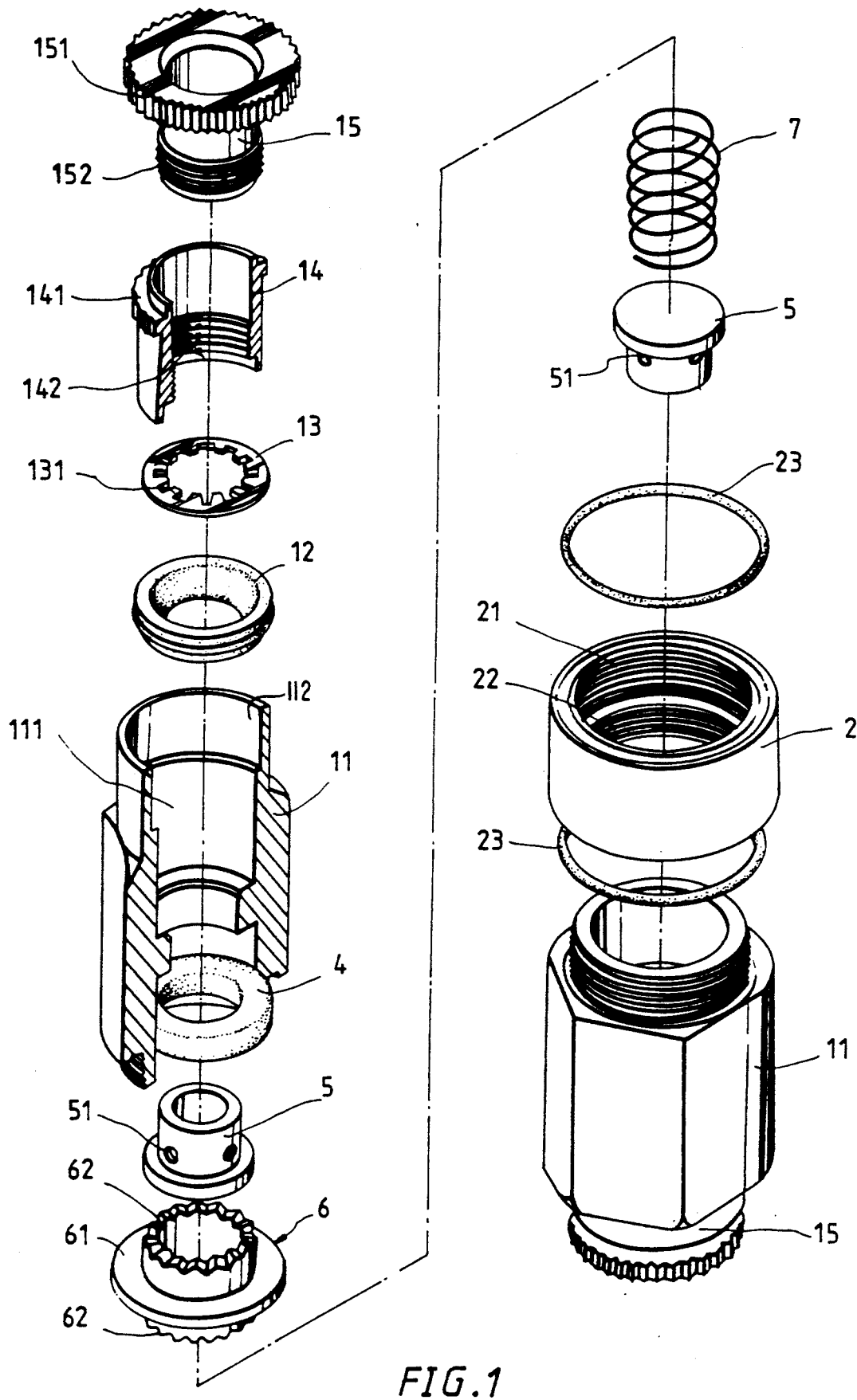
FIG. 1 is a perspective fragmented view of a quick-connect pipe fitting according to the present invention.

Referring to FIGS. 1 through 4, a quick-connect pipe fitting 1 according to the present invention mainly comprises a quick-connect fitting body 11, a seal washer 12, a lock washer 13, a base 14 and a compression member 15.

The fitting body 11, having a stepped central hole 111, is similar to a conventional device in structure.

The seal washer 12 is assembled underneath a small diameter portion of the stepped central hole 111 inside the fitting body 11. The seal washer 12 is also a conventional seal washer.

The lock washer 13, having an appropriate number of inner teeth 131, is also a conventional part.

The base 14, which fits inside of the stepped central hole 111, is a cylindrical body with a teeth ring 141 on its top and inner threads 142 on its bottom. The lock washer 13 fits snug at the end of the base 14.

The compression member 15, having a cylindrical body, forms a teeth shaped ring 151 at its top. The bottom of the compression member 15 has appropriate outer threads 152 to allow it to screw into the inner threads 142 of the base 14.

By assembling the above components, as is shown in FIG. 1, the base 14 is placed inside of the fitting body 11. The teeth ring 141 is snug against the inner wall of the stepped central hole 111. An inner wall 112 in the front portion of the fitting body 11 can be bent inward to prevent the base 14 from falling out. At the same time, the outer threads 152 of the compression member 15 is secured on the base 14, allowing the compression member 15 to screw in and out of the base 14 freely.

The curved wall 112 and the surface of the threads will prevent the base 14 from disengaging from the main body 11. This assembly allows a pressure pipe 8 to extend through the compression member 15, the lock washer 13, and the seal washer 12. When the pressure pipe 8 needs to be disconnected, the compression member 15 is pushed downward (inward). This pushes against the lock washer 13 and opens up the inner teeth 131. The pressure pipe 8 is no longer locked and may be pulled out easily.

An air valve according to the present invention is installed internally inside the fitting body 11, and a connecting member 2 is screwed onto the fitting body. A seal ring 4 and a vent valve 5 are installed inside the stepped central hole 111 of the fitting body 11. A connecting base 6 and a spring 7 are installed inside the connecting member 2.

The connecting member 2 is a hollow cylindrical body having two different internal screw threads 21 and 22. Such threads 21 and 22 are opposite in thread direction and are respectively screwed onto quick-connect fitting bodies with oil seals disposed therebetween.

The seal ring 4 is installed inside the stepped central hole 111 on the lower portion of the quick-connect fitting body 11.

The vent valve 5 is a hollow cylindrical body having a base at its end. The hollow cylindrical body has a plurality of vent holes 51. The hollow cylindrical body of the vent valve 5 is able to fit into the seal ring 4.

The connecting base 6 is a hollow tubing having an extension plate 61 at its center. Circular openings 62 are provided at both ends of the hollow tubing and have irregular shapes.

Figure 2:
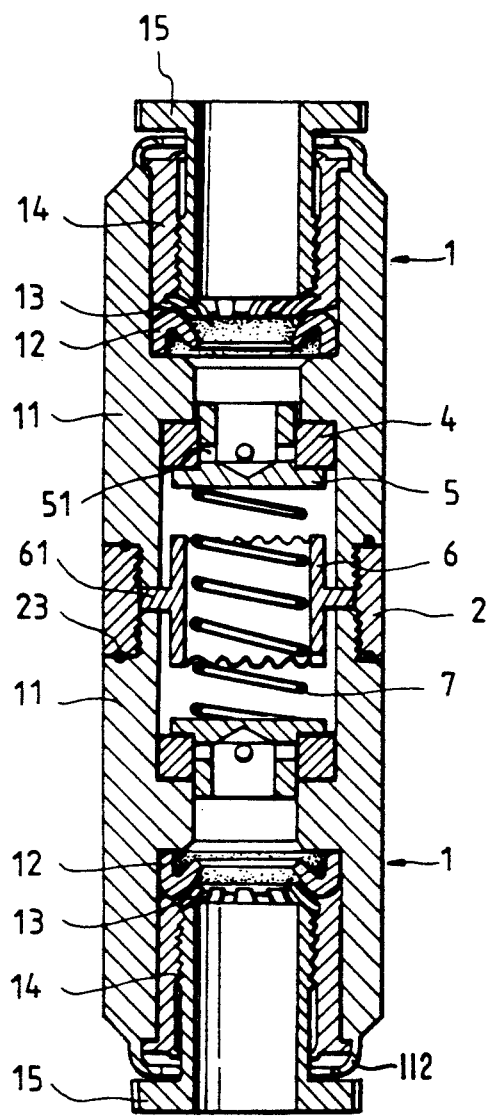
FIG. 2 is a sectional view of the quick-connect pipe fitting according to the present invention.
Figure 3:
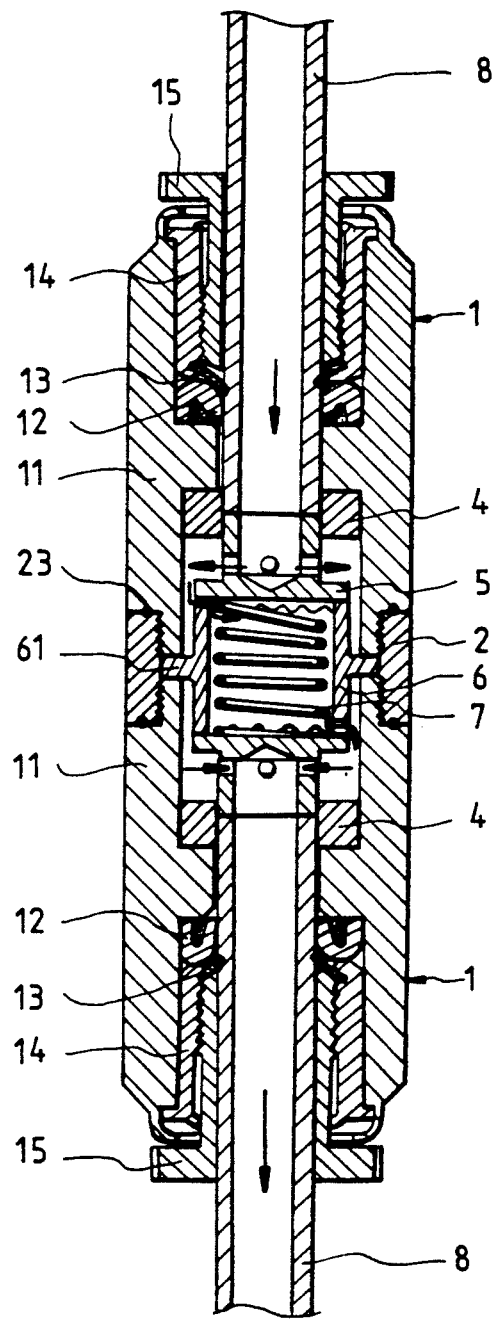
FIG. 3 is a sectional view of the pipe fitting connected to two pipe sections according to the present invention.
Figure 4:
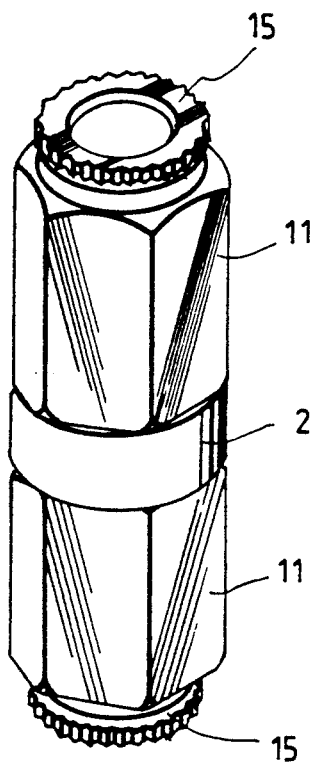
FIG. 4 is a perspective view of the pipe fitting assembly according to the present invention.
Figure 6:
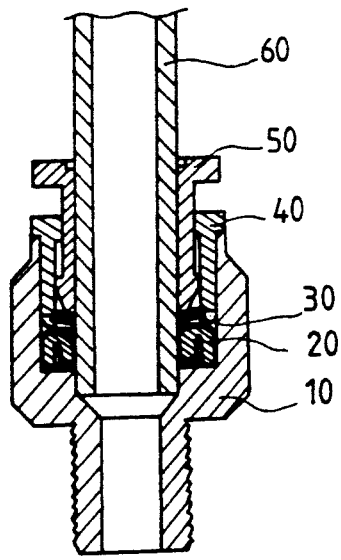
FIG. 6 is a section view of a conventional quick-connect pipe fitting assembly according to the prior art.

The spring 7 is installed inside the connecting base 6. The ends of the spring 7 are pressed against the vent valves 5, respectively. Normally, the spring 7 pushes the vent valve 5 into the seal ring 4, as shown in FIG. 2. The spring 7 is compressed when the pressure pipe 8 is inserted into the quick-connect fitting body 11, as shown in FIG. 3.

By using the above components, the connecting member 2 with the oil seal 23 is used to connect two quick-connect fitting bodies 11 together. When no pressure pipe 8 is inserted (see FIG. 2), the spring 7, held by the connecting base 6, is pressed against the two vent valves 5, such that the seal ring 4 seals off the vent holes 51. When the pressure pipe 8 is connected to the fitting body 11, it pushes the vent valve 5 against the bias of spring 7 and into contact with the connecting base 6, such that the vent holes 51 are exposed outwardly of the seal ring 4. Therefore, air flow comes through one end of the fitting body 11 and flows to the other fitting body 11. In order to assure that the air flow is uniform and unobstructed, the irregular-shaped circular openings 62 of the connecting base 6 form appropriate gaps to allow the air to go through. The same principle can also be applied by forming holes in the wall of the connecting base 6. Many modifications and variations are possible in light of the above description.

Figure 5:
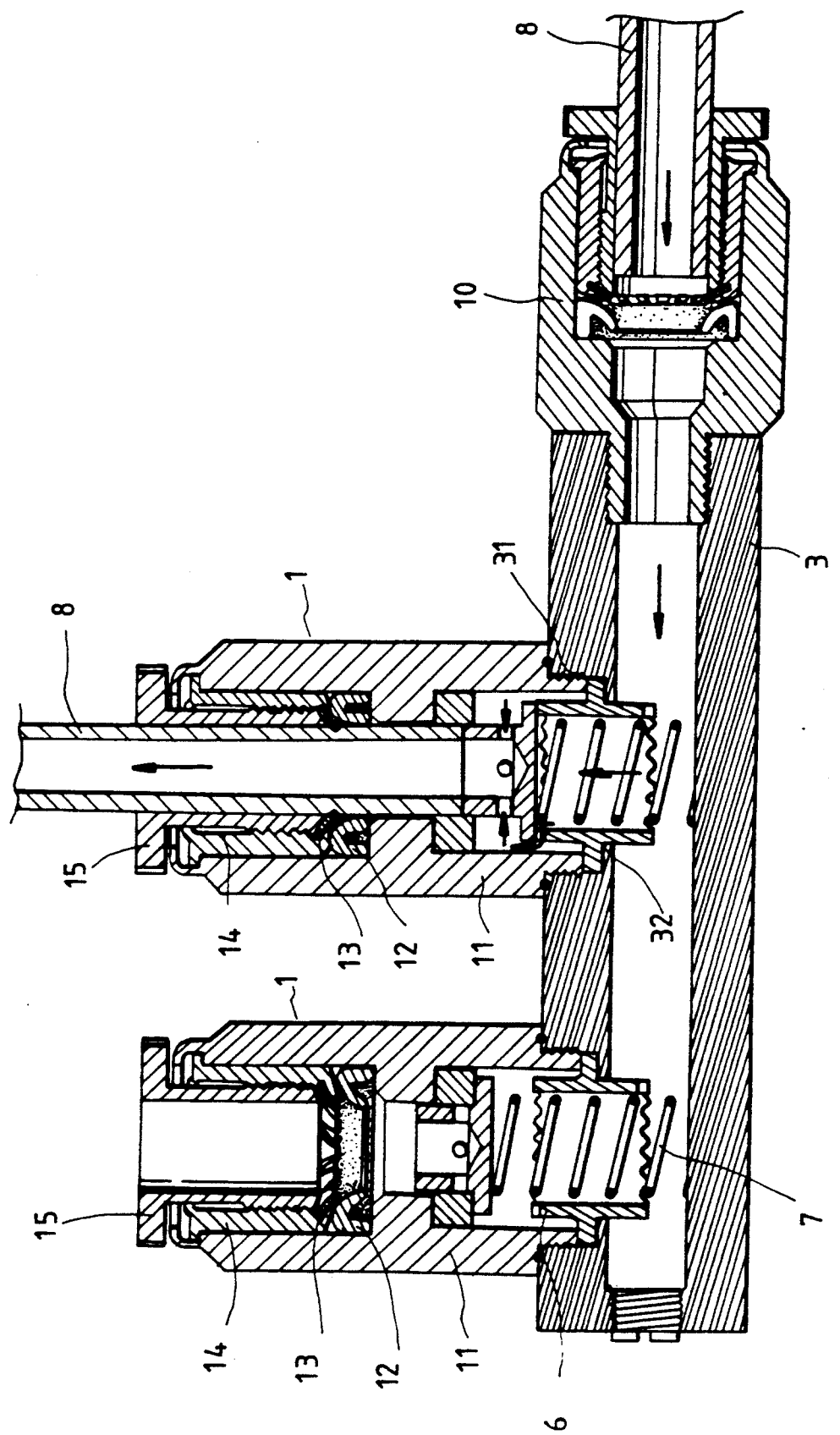
FIG. 5 is a sectional view of two pipe fitting assemblies branched from a main pressure line according to the present invention.

Referring to FIG. 5, a sectional view of two pipe fitting assemblies branched from a main pressure line is shown. The main pressure line 3 is formed with screw holes 31, each of which has a stepped portion 32 at its inner end. The connecting base 6 is then inserted into each of the screw holes 31 with the extension plate 61 resting on the stepped portion 32. The fitting body 11 with the oil seal 23 is screwed into the screw hole 31. One end of the spring 7 pushes the vent valve 5 into the seal ring 4, and the other end of the spring 7 is appropriately located to press against the inner wall of the main pressure line 3. When the pressure pipe 8 is inserted and connected, it pushes the vent valve toward the connecting base, such that the fitting body 11 allows air to flow therethrough.

We claim:

1. A quick-connect pipe fitting comprising:
   a cylindrical connecting member having a first threaded portion;
   a quick-connect fitting body having a central hole therethrough with an inwardly stepped portion, and having a threaded portion engaged with said first threaded portion of said connecting member;
   a seal ring mounted in said central hole of said quick-connect fitting body and adjacent said inwardly stepped portion;
   a vent valve mounted in said central hole of said quick-connect fitting body, said vent valve comprising a hollow cylindrical body with a vent hole formed therein, and a base portion fixed on a first end of said hollow cylindrical body to close said first end thereof, said hollow cylindrical body of said vent valve being slidably received in said seal ring;
   a connecting base mounted in said central hole of said quick-connect fitting body, said connecting base including a hollow cylindrical portion with irregularly shaped holes formed at each end thereof, and a radially outwardly projecting extension plate projecting outwardly from said hollow cylindrical portion and being mounted to said quick-connect fitting body; and
   a spring disposed in said hollow cylindrical portion of said connecting base and having a first end pressed against said base portion of said vent valve to normally urge said base portion of said vent valve toward said seal ring such that said vent hole formed in said hollow cylindrical body of said vent valve is normally closed by said seal ring, whereby when a pressure pipe is inserted into said central hole of said quick-connect fitting body to press against a second end of said hollow cylindrical body of said vent valve, said vent valve is slid toward said connecting base against the bias of said spring and said vent hole is uncovered from said seal ring.

2. A quick-connect pipe fitting as recited in claim 1, further comprising
   an oil seal interposed between said quick-connect fitting body and said connecting member.

3. A quick-connect pipe fitting as recited in claim 1, further comprising
   a seal washer mounted in said central hole of said quick-connect fitting body adjacent said stepped portion and on a side of said stepped portion opposite said seal ring;
   a lock washer mounted in said central hole of said quick-connect fitting body adjacent said seal washer, said lock washer having inwardly directed teeth adapted to engage the pressure pipe when the pressure pipe is inserted into said central hole of said quick-connect fitting body such that the pressure pipe can be inserted into said central hole but cannot normally be removed therefrom; and
   a compression member movably mounted to said quick-connect fitting body for movement between a normal rest position and a second position in which said compression member presses against said lock washer to disengage said inwardly directed teeth from the pressure pipe to allow the pressure pipe to be removed from said central hole of said quick-connect fitting body.

4. A quick-connect pipe fitting as recited in claim 3, further comprising
a cylindrical base mounted in said central hole of said quick-connect fitting body, said cylindrical base having a first end with internal threads formed thereon; and
wherein said compression member has a first end with external threads formed thereon, said external threads of said compression member being engaged with said internal threads of said cylindrical base.

5. A quick-connect pipe fitting as recited in claim 4, wherein
said cylindrical base has a second end with a toothed ring thereon, said toothed ring being engaged against an internal wall of said quick-connect fitting body; and
said compression member has a second end with a toothed ring thereon, said toothed ring of said compression member being disposed outwardly of said quick-connect fitting body.

6. A quick-connect pipe fitting as recited in claim 4, wherein
said quick-connect fitting body has an inwardly bent wall portion, at an end thereof adjacent which said compression member is mounted, for retaining said cylindrical base within said central hole.

7. A quick-connect pipe fitting as recited in claim 1, further comprising
a main pressure line having an internally threaded hole formed radially through a portion thereof, said portion of said main pressure line constituting said cylindrical connecting member such that said threaded portion of said quick-connect fitting body is engaged in said internally threaded hole of said main pressure line, said extension plate of said connecting base is engaged in said internally threaded hole of said main pressure line, and an end of said connecting base extends into an interior of said main pressure line.

8. A quick-connect pipe fitting as recited in claim 7, wherein
a second end of said spring bears against an interior wall of said main pressure line.

9. A quick-connect pipe fitting comprising:
a cylindrical connecting member having a first end with a first threaded portion thereon and a second end with a second threaded portion thereon;
a first quick-connect fitting body having a central hole therethrough with an inwardly stepped portion, and having a threaded portion engaged with said first threaded portion of said connecting member;
a first seal ring mounted in said central hole of said first quick-connect fitting body and adjacent said inwardly stepped portion of said central hole of said first quick-connect fitting body;
a first vent valve mounted in said central hole of said first quick-connect fitting body, said first vent valve comprising a first hollow cylindrical body with a first vent hole formed therein, and a first base portion fixed on a first end of said first hollow cylindrical body to close said first end thereof, said first hollow cylindrical body of said first vent valve being slidably received in said first seal ring;
a second quick-connect fitting body having a central hole therethrough with an inwardly stepped portion, and having a threaded portion engaged with said second threaded portion of said connecting member;
a second real ring mounted in said central hole of said second quick-connect fitting body and adjacent said inwardly stepped portion of said central hole of said second quick-connect fitting body;
a second vent valve mounted in said central hole of said second quick-connect fitting body, said second vent valve comprising a second hollow cylindrical body with a vent hole formed therein, and a second base portion fixed on a first end of said second hollow cylindrical body to close said first end thereof, said second hollow cylindrical body of said second vent valve being slidably received in said second seal ring;
a connecting base mounted in said central holes of said first and second quick-connect fitting bodies, said connecting base including a hollow cylindrical portion with irregularly shaped holes formed at each end thereof, and a radially outwardly projecting extension plate projecting outwardly from said hollow cylindrical portion and being mounted to said first and second quick-connect fitting bodies;
a spring disposed in said hollow cylindrical portion of said connecting base and having a first end pressed against said first base portion of said first vent valve to normally urge said first base portion of said first vent valve toward said first seal ring such that said first vent hole formed in said first hollow cylindrical body of said first vent valve is normally closed by said first seal ring, whereby when a pressure pipe is inserted into said central hole of said first quick-connect fitting body to press against a second end of said first hollow cylindrical body of said first vent valve, said first vent valve is slid toward said connecting base against the bias of said spring and said first vent hole is uncovered from said first seal ring; and
wherein said spring has a second end pressed against said second base portion of said second vent valve to normally urge said second base portion of said second vent valve toward said second seal ring such that said second vent hole formed in said second hollow cylindrical body of said second vent valve is normally closed by said second seal ring, whereby when a pressure pipe is inserted into said central hole of said second quick-connect fitting body to press against a second end of said second hollow cylindrical body of said second vent valve, said second vent valve is slid toward said connecting base against the bias of said spring and said second vent hole is uncovered from said second seal ring.

10. A quick-connect pipe fitting as recited in claim 9, further comprising
oil seals are respectively interposed between said connecting member and each of said first and second quick-connect fitting bodies.

11. A quick-connect pipe fitting as recited in claim 9, further comprising
a first seal washer mounted in said central hole of said first quick-connect fitting body adjacent said stepped portion of said central hole of said first quick-connect fitting body and on a side of said stepped portion of said central hole of said first quick-connect fitting body opposite said first seal ring;

a first lock washer mounted in said central hole of said first quick-connect fitting body adjacent said first seal washer, said first lock washer having first inwardly directed teeth adapted to engage the pressure pipe when the pressure pipe is inserted into said central hole of said first quick-connect fitting body such that the pressure pipe can be inserted into said central hole of said first quick-connect fitting body but cannot normally be removed therefrom;

a first compression member movably mounted to said first quick-connect fitting body for movement between a normal rest position and a second position in which said first compression member presses against said first lock washer to disengage said first inwardly directed teeth from the pressure pipe to allow the pressure pipe to be removed from said central hole of said first quick-connect fitting body;

a second seal washer mounted in said central hole of said second quick-connect fitting body adjacent said stepped portion of said central hole of said second quick-connect fitting body and on a side of said stepped portion of said central hole of said second quick-connect fitting body opposite said second seal ring;

a second lock washer mounted in said central hole of said second quick-connect fitting body adjacent said second seal washer, said second lock washer having second inwardly directed teeth adapted to engage the pressure pipe when the pressure pipe is inserted into said central hole of said second quick-connect fitting body such that the pressure pipe can be inserted into said central hole of said second quick-connect fitting body but cannot normally be removed therefrom; and a second compression member movably mounted to said second quick-connect fitting body for movement between a normal rest position and a second position in which said second compression member presses against said second lock washer to disengage said second inwardly directed teeth from the pressure pipe to allow the pressure pipe to be removed from said central hole of said second quick-connect fitting body.

12. A quick-connect pipe fitting as recited in claim 11, further comprising a first cylindrical base mounted in said central hole of said first quick-connect fitting body said first cylindrical base having a first end with internal threads formed thereon;

a second cylindrical base mounted in said central hole of said second quick-connect fitting body said second cylindrical base having a first end with internal threads formed thereon;

wherein said first compression member has a first end with external threads formed thereon, said external threads of said first compression member being engaged with said internal threads of said first cylindrical base; and wherein said second compression member has a first end with external threads formed thereon, said external threads of said second compression member being engaged with said internal threads of said second cylindrical base.

13. A quick-connect pipe fitting as recited in claim 12, wherein said first cylindrical base has a second end with a toothed ring thereon, said toothed ring of said first cylindrical base being engaged against an internal wall of said first quick-connect fitting body;

said first compression member has a second end with a toothed ring thereon, said toothed ring of said first compression member being disposed outwardly of said first quick-connect fitting body;

said second cylindrical base has a second end with a toothed ring thereon, said toothed ring of said second cylindrical base being engaged against an internal wall of said second quick-connect fitting body; and said second compression member has a second end with a toothed ring thereon, said toothed ring of said second compression member being disposed outwardly of said second quick-connect fitting body.

14. A quick-connect pipe fitting as recited in claim 12, wherein said first quick-connect fitting body has an inwardly bent wall portion, at an end thereof adjacent which said first compression member is mounted, for retaining said first cylindrical base within said central hole of said first quick-connect fitting body; and said second quick-connect fitting body has an inwardly bent wall portion, at an end thereof adjacent which said second compression member is mounted, for retaining said second cylindrical base within said central hole of said second quick-connect fitting body.

* * * * *